Patented Dec. 11, 1928.

1,695,147

UNITED STATES PATENT OFFICE.

HANS HAHL AND WALTER KROPP, OF ELBERFELD, GERMANY, ASSIGNORS TO WINTHROP CHEMICAL COMPANY, INC., OF NEW YORK, N. Y.

VANADIUM COMPOUND.

No Drawing. Application filed July 10, 1925, Serial No. 42,831, and in Germany September 17, 1924.

The present invention concerns the production of the hitherto unknown compounds of tetravalent vanadium with carboxylic acids, such as triglycollamic, tartaric acid, thioglycollic acid, salicylic acid, mandelic acid or the like. The new compounds have proved to be valuable remedies against syphilis.

They are after being dried and pulverized dark powders soluble in water. The aqueous solutions show no irritating action. They can be employed for subcutaneous injections.

The process for producing our new products consists in treating salts of the above mentioned acids with vanadium tetroxide or its salts or by treating the free acids with vanadium tetroxide or its salts and neutralizing the resulting acid solutions with caustic alkalis or alkaline earths.

In order to illustrate our new process more fully the following example is given:—

20 parts by weight of triglycollamic acid $N(CH_2.COOH)_3$ are heated together with 200 parts by weight of water and 6 parts by weight of magnesium oxide until all is dissolved. Subsequently 10 parts by weight of vanadium tetroxide are added and the mixture is further heated for some time. After the reaction is complete, it is filtered and the filtrate is evaporated to dryness. The new product is a greyish powder having most probably the formula:

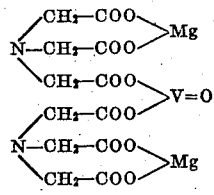

being soluble in water.

The analogous product obtained from salicylic acid, sodium hydroxide and vanadium tetroxide has most probably the formula:

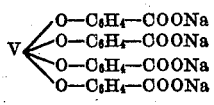

It is a greyish-brown powder soluble in water with a slightly alkaline reaction.

We claim:—

1. As an anti-syphilitic, a salt of an inorganic base with an organic tetravalent vanadyl carboxylate.
2. As a new product, a compound of a salt of tetravalent vanadium with an organic carboxylic acid, having most probably the formula $$V-(O-R-M)_4,$$

wherein V represents vanadium, O represents oxygen, R represents an organic carboxylic acid residue, and M represents the residue of an inorganic base.

3. As a new product, a compound of a salt of tetravalent vanadium with an organic carboxylic acid, having most probably the formula

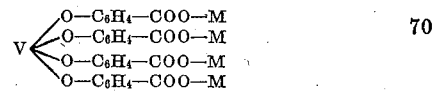

wherein V represents vanadium and M represents the residue of an inorganic base.

4. The herein described new organic tetravalent vanadyl carboxylates having most probably the following formula $$V-(R-M)_4$$

wherein V represents a tetravalent vanadium radicle containing oxygen and R—M represents an inorganic basic salt of a residue of an organic carboxylic acid being greyish to greyish-brown powders readily soluble in water and valuable anti-syphilitics for subcutaneous use in aqueous solutions, substantially as described.

In testimony whereof we have hereunto set our hands.

HANS HAHL.
WALTER KROPP.